Dec. 29, 1931. O. DAHL ET AL 1,838,366
REFRIGERATING PLANT FOR THE FREEZING OF FISH AND OTHER GOODS
Filed Aug. 10, 1928
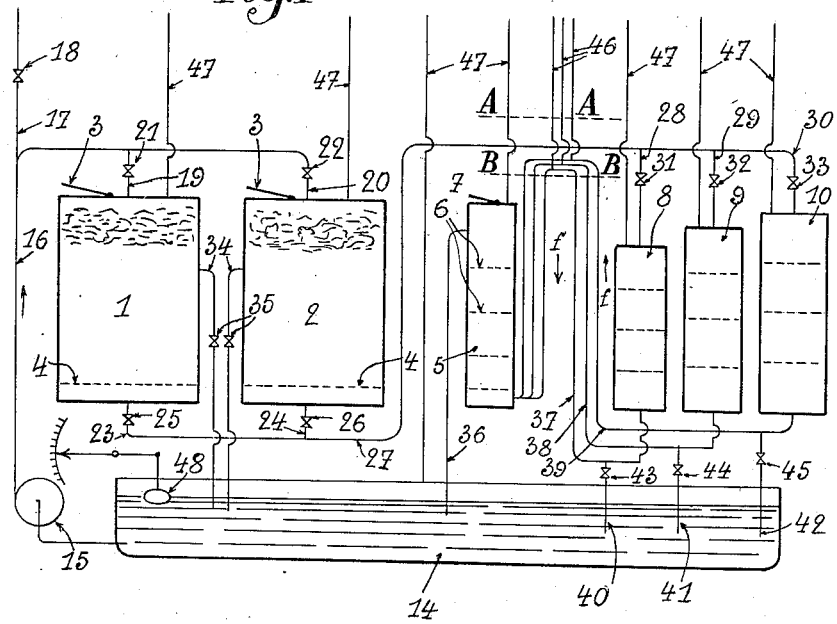
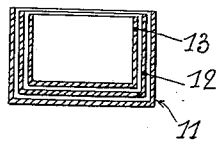
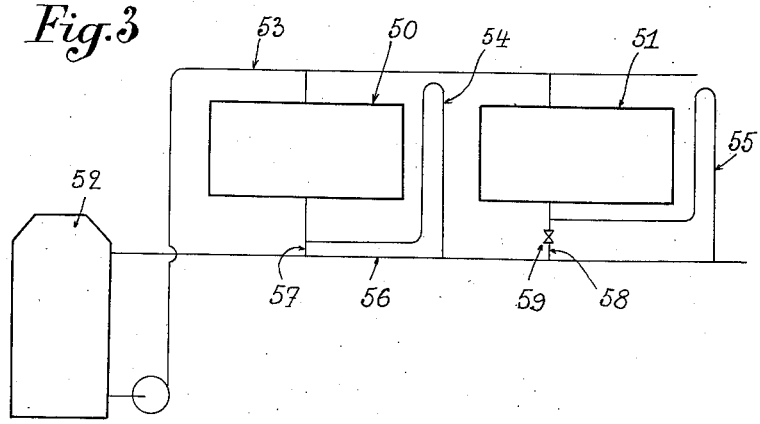
INVENTORS:
Oscar Dahl
Erik Arnfinn Hallgrim Kjerstad
BY
ATTORNEYS Patented Dec. 29, 1931

1,838,366

UNITED STATES PATENT OFFICE

OSCAR DAHL AND ERIK ARNFINN HALLGRIM KJÖRSTAD, OF LA ROCHELLE, FRANCE

REFRIGERATING PLANT FOR THE FREEZING OF FISH AND OTHER GOODS

Application filed August 10, 1928, Serial No. 298,668, and in France March 17, 1928.

The present invention relates to refrigerating plants for the freezing of fish and other alimentary substances, in which a cooling brine produced by melting ice in a salt solution, is circulated in a closed circuit through freezing chambers containing the fish or other goods to be frozen.

The invention has chiefly for its object to provide a refrigerating plant which may be readily mounted on board trawlers and like fishing vessels and, hence, to provide a plant of reduced size and bulk, care being taken to avoid the prejudicial effect of the vessel motion. The invention has further for its object to provide a continuously operating plant, and, in the case of a plant mounted on board ships, to provide for the continuous freezing of the fish as fast as caught. A further object is to provide for a more or less automatic operation of the plant, so as to minimize the attention required from the crew, while the errors in manipulation will not have any serious effect upon the operation of the plant.

According to an important feature of the invention, the plant comprises several brine generators and several freezing chambers in which the fish are frozen, these various apparatus being mounted in parallel between a cold brine collector and a collector for the brine to be cooled, a compensating tank being preferably associated with one of said collectors or with the brine-generator, whereby one or more brine generators or freezing chambers may be cut off from the circuit.

The several apparatus (brine generators and freezing chambers) consist of tight receptacles which are kept constantly filled with brine when in operation, means being provided to cut off one or more apparatus from the brine circuit, in order to empty a brine generator or to charge it with ice, or to charge a freezing chamber with fish, or for any other purposes, without interrupting the operation of the other apparatus. By this arrangement the proper number of apparatus can be set in operation in accordance with the quantity of fish to be frozen.

To reduce the bulk of the plant on board to a minimum, when the fish are frozen in boxes, the said boxes may be arranged in several series of boxes of increasing size, the smaller ones fitting into the larger, so as to occupy the minimum space when empty, while the different fish freezing chambers are so designed and dimensioned as to receive boxes belonging to the different series respectively. Those boxes which become filled with frozen fish may then take the place of the ice and salt which was taken on board in the first place and which is progressively exhausted during the freezing process.

To minimize the operations required for the control of the operation of the plant and to prevent any serious inconvenience from errors in the manipulation, it is advantageous to dispose between the apparatus in which the brine is successively circulated, vertical bent pipes rising to a height such that the circulation of the brine under the effect of the static load or head will take place only in a given direction, said pipes being in communication with the atmosphere to prevent siphon effect.

Due to this arrangement the brine is prevented from returning into an apparatus which has been cut off from the circuit, even if the cock placed at the outlet of the apparatus has been accidentally left open; this also obviates the manipulation of the cocks at the outlet of the apparatus, and the latter may be replaced by pipes of small diameter which normally provide for the return of a small amount of brine into a storage tank, so that when an apparatus is cut off from the circuit, said apparatus may be emptied through said pipe in a few minutes. These small pipes may further be provided with cocks for controlling the pressure produced in the apparatus by the provision of the vertical bent pipes.

To obtain a brine whose composition and temperature are as uniform as possible, it is advantageous to place in the brine circuit a compensating or storage tank of large size.

In the appended drawings:

Fig. 1 is a diagrammatic view showing a fish freezing plant according to the invention.

Fig. 2 is a diagrammatic view showing in section three empty fish boxes fitted into one another.

Fig. 3 shows a modification of the plant.

As shown in Fig. 1, 1 and 2 are brine generators which preferably consist of tight receptacles, each provided with a loading door 3 and a lower perforated plate 4 upon which the ice is deposited. 5 is a tight receptacle having a plurality of superposed perforated plates 6 adapted to receive the salt which is supplied through a tight closing door 7. 8—9—10 are freezing chambers adapted to contain the fish which may be disposed in boxes 13—12—11 having perforated bottoms and adapted to be located on respective superposed openwork supports secured at the proper height in said chambers 8, 9, 10, tight joints being preferably provided between the walls of the said boxes and the walls of the chamber (for example as disclosed in our copending patent application No. 246,473, filed January 13, 1928 now matured into Patent No. 1,791,023) to cause the brine to circulate through the boxes in direct contact with the food and prevent the circulation of the brine along said walls. Since this arrangement does not form part of the present invention, it has not been illustrated in detail. 14 is a storage or compensating tank of large size. The brine is withdrawn from tank 14 by a pump 15 or the like, and it is delivered through a pipe 16, provided with an overflow pipe 17 (having a cock 18), and through branch pipes 19—20 provided with cocks 21—22 into the brine generators 1 and 2. At the outlet of chambers 1 and 2, are branch pipes 23—24 provided with cocks 25—26, said pipes opening into a main conduit 27 adapted to supply the different freezing chambers 8—9—10 through the branch pipes 28—29—30, provided with cocks 31—32—33. The receptacles 1—2 are provided with overflow pipes 34 having cocks 35.

The outlet of the chambers 8—9—10 is connected with the salt receptacle 5, whose outlet is connected, by a pipe 36, with tank 14.

Brine generators 1 and 2, on the one hand, and freezing chambers 8—9—10, on the other hand, are placed in parallel or by-pass arrangement above the main brine circulation piping and storage tank 14, and this permits temporarily cutting off one of the brine generators or one of the freezing chambers, for instance for filling purposes.

According to another feature of the invention, each freezing chamber 8—9—10 is connected with the salt receptacle 5 by a distinct outlet pipe 37—38—39, and each pipe rises to a relatively high level and then extends down to the inlet of the salt receptacle 5. Each pipe 37—38—39 also communicates with storage tank 14 by a pipe, 40—41—42 respectively, which may be optionally provided with a respective cock 43—44—45. Each bent pipe has at the upper part a conduit 46 in communication with the atmosphere, to prevent all siphon effects. For the same purpose, and also to allow the discharge of the gas contained in the brine, the several apparatus may be provided with chimneys 47 open to the atmosphere.

Due to the provision of the vertical bent pipes 37—38—39, chambers 8—9—10 can be maintained under a pressure which is at least equal to the height of the column of the brine contained in the said pipes. When one of the cocks 31, 32, 33 is closed in order to cut off any one of the chambers 8—9—10 for emptying purposes, the brine is prevented from returning from receptacle 5 to the freezing chamber which has thus been cut off from the circuit for the following reason;

When the cocks 31—32—33 are opened, the brine rises in chimneys 46 to the level A—A so that the brine may flow in the direction of the arrows $f$. When cock 31, for instance, is closed, the level of the brine in pipe 37 will be lowered to B—B, and the brine will not return from receptacle 5 to chamber 8.

To empty chamber 8 for example, cock 43 is opened. To simplify the operation, the said cock 43 may be constantly open to a slight extent, or the pipe 40 may be given a small cross section in such manner that a certain amount of brine will be constantly discharged through said pipe. When cock 31 is closed, in order to empty chamber 8, the brine contained therein will flow out in a few minutes through pipe 40 into storage tank 14, this being possible since chamber 8 is connected with the atmosphere by chimney 47. When cocks such as 43 are mounted on the pipes 40, 41, 42 the excess of pressure in the freezing chambers may be individually varied by adjusting the rate of discharge of the brine through said pipes.

As shown in the drawings, the boxes 11—12—13 (Fig. 2) are of such shape and size that they may be readily inserted into one another, as herein represented. The shape of chambers 8—9—10 is such that boxes 11—12—13 will respectively fit into chambers 8—9—10. When the ship starts out, the said boxes, which are empty, can be fitted into one another, thus reducing the bulk on board. When a certain quantity of fish has been frozen, the filled boxes may take the place of the ice and salt which have been consumed in the meantime.

Another advantage of these improved boxes consists in that the boxes may be so designed as to correspond to the nature and size of the various fish which are caught, and to the rate of freezing of these various fish, which obviously depends upon their shape and size. Each freezing chamber may be especially adapted for receiving a certain class of fish, whose rate of freezing will differ from the rate of freezing of the fish in the adjacent chambers.

In the arrangement shown in Fig. 1, the storage tank 14 is placed in the brine circuit, between the pipe 36 and the suction pipe of pump 15. The brine contained in this large tank forms a storage supply which compensates for variations in the composition and the temperature of the brine.

As herein represented, the said tank 14 may be provided with a level indicating device 48; the excess of brine, resulting from the melting of the ice, may thus be discharged through the overflow pipe 17 at the proper instant.

The vertical bent pipes 37—38—39 can obviously be replaced by check valves, but it has been shown by experience that the said pipes 37—38—39 operate in a more efficient manner and do not require inspection and repairs.

Fig. 3 illustrates a modified plant according to the invention, in which the different freezing chambers 50, 51, etc. are supplied through a collector 53 from a single brine generator 52, which also constitutes a storage tank for the brine.

In this example, the vertical bent pipes 54—55 are directly connected with the main conduit 56 for the return of the brine.

As in the preceding case, the by-pass pipes 57—58 will allow the direct emptying of the chambers 50 and 51 into the main conduit 56. The said pipes may be optionally provided with regulating cocks 59.

The said invention is obviously independent of the freezing method itself. The brine may circulate downwardly in the freezing chambers, or from the centre to the periphery, or in the direction of the length of the fish, etc.

The pump 13, instead of delivering the brine into the apparatus, may withdraw the brine therefrom and discharge it into the tank 14.

It is further evident that vertical bent pipes such as 37—38—39 may be disposed between the brine producing apparatus 1 and 2 and the freezing chambers, and that the several recipients may be all mounted in parallel with reference to the tank 14.

Having now described our invention, what we claim as new and desire to secure by Letters Patent is:

1. In a refrigerating plant wherein a cooling brine is circulated in a closed circuit, a number of apparatus adapted to be passed through by the brine, a number of said apparatus being arranged in parallel and, between one of the parallel arranged apparatus and the preceding apparatus, means for preventing the return of brine embodying two substantially vertical conduits in communication with each other at the upper part, at a level at least equal to the level of the brine column in said conduits which balances the pressure prevailing in said preceding apparatus.

2. In a refrigerating plant as claimed in claim 1, a vertical tube open to the atmosphere and opening into said conduits at the upper part thereof.

3. A refrigerating plant as claimed in claim 1, wherein said means comprise a vertical bent tube having substantially vertical portions connected by a bent portion at the upper part.

4. A refrigerating plant comprising a number of brine generating apparatus, a number of freezing apparatus adapted to receive the goods to be frozen, brine collectors adapted to connect said apparatus with each other, a number of them in parallel, means for circulating the brine through said apparatus and, between one of the parallel arranged apparatus and the preceding apparatus a vertical bent tube having substantially vertical portions connected by a bent portion at the upper part at a level at least equal to the level of the brine column in said tubes which balances the pressure prevailing in said preceding apparatus, and by-pass means for connecting the parallel arranged apparatus with the brine return collector and adapted to afford a constant discharge of brine at a comparatively small rate.

5. A refrigerating plant as claimed in claim 4 wherein said by-pass means comprise a tube and an adjusting cock on said tube.

6. A refrigerating plant comprising at least a brine generator, a storage tank of large capacity connected with the inlet of said brine generator, means for forcing brine from said tank into said generator, a cold brine collector, a number of freezing chambers connected in parallel with said cold brine collector, and means for returning brine from the respective freezing chambers to said storage tank comprising vertical bent tubes having two substantially vertical portions respectively in communication with the outlet of said freezing chambers and with said tank and means for directly by-passing brine at a small rate directly from said freezing chambers to said storage tank.

In testimony whereof we have signed our names to this specification.

OSCAR DAHL.
ERIK ARNFINN HALLGRIM KJÖRSTAD.